(No Model.) 10 Sheets—Sheet 1.

C. H. MURRAY.
MEANS FOR CONTROLLING HYDRAULIC APPARATUS FOR TRAINING HEAVY GUNS.

No. 382,377. Patented May 8, 1888.

Fig. 1.

Witnesses.
C. P. Elwell
J. L. Holmes

Inventor.
Charles Henry Murray
By his Attys
Baldwin Hopkins & Peyton (No Model.) 10 Sheets—Sheet 3.
C. H. MURRAY.
MEANS FOR CONTROLLING HYDRAULIC APPARATUS FOR TRAINING HEAVY GUNS.

No. 382,377. Patented May 8, 1888.

Fig. 2.

Witnesses.
C. P. Elwell
N. L. Holmes

Inventor.
Charles Henry Murray
By his Atty
Baldwin Hopkinson (No Model.)

C. H. MURRAY.
MEANS FOR CONTROLLING HYDRAULIC APPARATUS FOR TRAINING HEAVY GUNS.

No. 382,377. Patented May 8, 1888.

(No Model.) 10 Sheets—Sheet 5.
C. H. MURRAY.
MEANS FOR CONTROLLING HYDRAULIC APPARATUS FOR TRAINING HEAVY GUNS.

No. 382,377. Patented May 8, 1888.

Fig. 3.

Witnesses.
C. P. Elwell
A. L. Holmes.

Inventor.
Charles Henry Murray.
By his Attys
Baldwin Hopkins & Peyton

(No Model.) 10 Sheets—Sheet 6.
C. H. MURRAY.
MEANS FOR CONTROLLING HYDRAULIC APPARATUS FOR TRAINING HEAVY GUNS.

No. 382,377. Patented May 8, 1888.

UNITED STATES PATENT OFFICE.

CHARLES H. MURRAY, OF NEWCASTLE-UPON-TYNE, ENGLAND, ASSIGNOR TO W. G. ARMSTRONG, MITCHELL & CO., (LIMITED,) OF SAME PLACE.

MEANS FOR CONTROLLING HYDRAULIC APPARATUS FOR TRAINING HEAVY GUNS.

SPECIFICATION forming part of Letters Patent No. 382,377, dated May 8, 1888.

Application filed June 15, 1887. Serial No. 241,380. (No model.) Patented in Italy December 31, 1886, No. 20,755.

*To all whom it may concern:*

Be it known that I, CHARLES HENRY MURRAY, of the Elswick Works, Newcastle-upon-Tyne, England, engineer, a subject of the Queen of Great Britain, have invented certain new and useful Improved Means for Controlling Hydraulic Apparatus Used for Training Heavy Guns and Revolving Turrets and Turn-Tables, (for which I have received Letters Patent in Italy, No. 20,755, dated December 31, 1886,) of which the following is a specification.

This invention has for its object improved means for controlling hydraulic apparatus used for training heavy guns and revolving turrets and turn-tables.

The working slide-valves of the hydraulic engines employed to train heavy guns and to turn turrets and turn-tables are too large to be moved by hand-power, and it is usual to apply a hydraulic reversing-cylinder to move them by power, and to work this reversing-cylinder through a valve moved by hand made so that the movement of the reversing-cylinder counteracts the movement made by hand, with the result that the engine runs at whatever speed corresponds with any opening given to the valve, and it continues to so run until the valves are closed again by hand through the medium of the hydraulic reversing-cylinder.

I make the further improvement and cause the engine as it revolves to close its own working-valves, so that it shall be necessary to continually open them to keep the engine running. This I do in the following way: The reversing-cylinder has a piston-rod projecting well out of the cylinder and screwed at its outer end for a length somewhat more than the length of the stroke of the cylinder. A large nut is fitted to this screw made in the form of a pinion, and into the pinion thus formed is geared a wheel driven by the engine. The working-valves of the engine are connected freely to this nut. Farther along the screw is a smaller nut, also made in the form of a pinion, and gearing into it there is a pinion which can be turned by hand. A small D-valve is connected freely to this smaller nut, and this D-valve supplies pressure to either side of the reversing-cylinder. The action is as follows: The small pinion-nut is worked along the screw by turning the hand-wheel. This action opens the little D-valve and supplies water to one end of the reversing-cylinder. The reversing piston and rod therefore make a partial stroke, which shuts the small D-valve, thus stopping further action and opens all the engine-valves and makes the engine run. The running of the engine works the large pinion-nut along the screw, and, shutting off the slide-valves, brings the engine to rest. When the hand-gear is continually turned, the engine is kept continually running at a speed which depends upon the amount of lead at which the hand-wheel pinion-nut is kept in advance of the engine pinion-nut. Furthermore, to avoid the necessity of turning the hand-wheel for a long time, I arrange to clutch the hand-wheel pinion-nut to the engine pinion-nut when so set that the desired speed is attained. Then that speed will continue till the engine has run its full course, which occurs when the reversing-cylinder gets to the end of its stroke. The advantages in this arrangement are that it is not necessary to fit separate stop-gear, as at present, as the engine can only travel as far as the stroke of the reversing cylinder determines. It is also unnecessary to fit separate indicator-gear to show the position of the turret, as that is known from the number of revolutions made by the hand-wheel. The arrangement gives much greater facility in training through the very small angle necessary for laying the guns on distant objects, because a small movement can be given to the hand-wheel with the certainty that a corresponding movement will be made by the engine, and no more, whereas with the present arrangements there is hardly time to observe that the turret has commenced to move before it has overshot the intended mark, and at the best the attention is taken up with stopping the training at the very instant that the sights are passing over the target.

2 is a vertical section of the same on the line 2 of Fig. 1; Figs. 1ᵃ 2ᵃ 3ᵃ, views on an enlarged scale respectively corresponding in part with portions of Figs. 1, 2, and 3, and showing parts omitted from or outlined only in said figures. Figs. 1ᵇ, 2ᵇ, and 3ᵇ are detail views showing some parts represented by Figs. 1ᵃ, 2ᵃ, and 3ᵃ on a still larger scale. Fig. 3ᶜ is a section through the center of the clutch.

Figure 4:
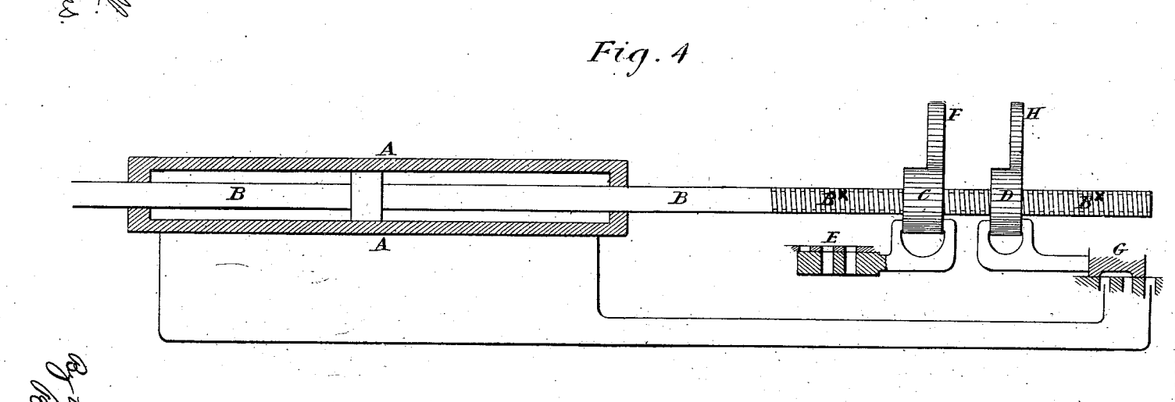
Fig. 4 is a diagram view to facilitate the explanation of the action of the hydraulic mechanism.

In the diagram view, Fig. 4, A is the reversing-cylinder; B, a piston-rod projecting from its ends and having a screw-thread, B×, cut upon it.

C and D are pinions, formed as nuts, to screw onto this screw-thread. The pinion C is coupled to a slide-valve, E, for admitting water under pressure to the cylinders of the hydraulic engine, to drive the engine in one or the other direction according to the position into which the valve is moved.

F is a pinion gearing with the pinion C and driven by the hydraulic engines whenever they are put into movement.

When the valve has been moved in one or the other direction to start the engines either forward or backward, the pinion C is revolved by the engines in such a direction as to traverse the valve in the opposite direction to that in which it was previously revolved, so that the engines continue to turn until the valve has been brought back to its original position.

The pinion D is coupled to a small slide-valve, G, by which water under pressure can be admitted to either end of the cylinder A and to escape from its opposite end.

H is a pinion gearing with the pinion D, and which can be turned by a hand-wheel on its axis. By revolving the hand-wheel the pinion D can be made to screw along the screw B× in either direction. In doing so it moves the valve G and admits water under pressure to one or other end of the cylinder A. This causes the piston-rod B to be moved endwise in the opposite direction to that in which the valve was moved, and so at once closes the valve. At the same time it shifts the valve E and starts the engines, and the engines continue to turn until by the revolving of the pinion C the valve E has been brought back to its normal position.

As before explained, the engines can be kept running either by continuing to turn the pinion D by hand or by clutching together the pinions C and D when the engines have been started and are running at the speed required.

In the complete arrangement two hydraulic turning engines are used. These are placed on each side of the turret or turn-table I at J, and they act on the fixed rack I' below the turret in the usual manner by a pinion, I², on the crank-shaft of each engine gearing into a toothed wheel, I³, on the axis of which is a pinion, I⁴, that gears into a toothed wheel, I⁵; on the axis of which is a pinion, I⁶, gearing into the fixed rack I'. The starting and reversing valves of these engines are ordinary sliding valves with ports, and are marked E, as in Fig. 4. The starting and reversing cylinder which works these valves is also, as in Fig. 4, marked A, and actuates them through the piston-rods B and the links B' and bell-cranks B². The piston-rods B are each screwed at their outer ends, and have upon them pinion-nuts C, which are turned by the engines whenever the engines are in motion. This is done by the axis of the toothed wheel I³ and pinion I⁴, which is driven from the engine, as above explained, having upon it a bevel-wheel, K, gearing into a corresponding wheel, K', on the axis of which is a bevel-pinion, K², gearing with a bevel-pinion, K³, on one end of a shaft, at the opposite end of which is a bevel-pinion, K⁴, that gears into a bevel-pinion, K⁵, on the axis of which is a toothed wheel, F, gearing into the teeth of the pinion-nut C.

G is the auxiliary valve, which supplies water to either end of the cylinder A.

Figure 1:
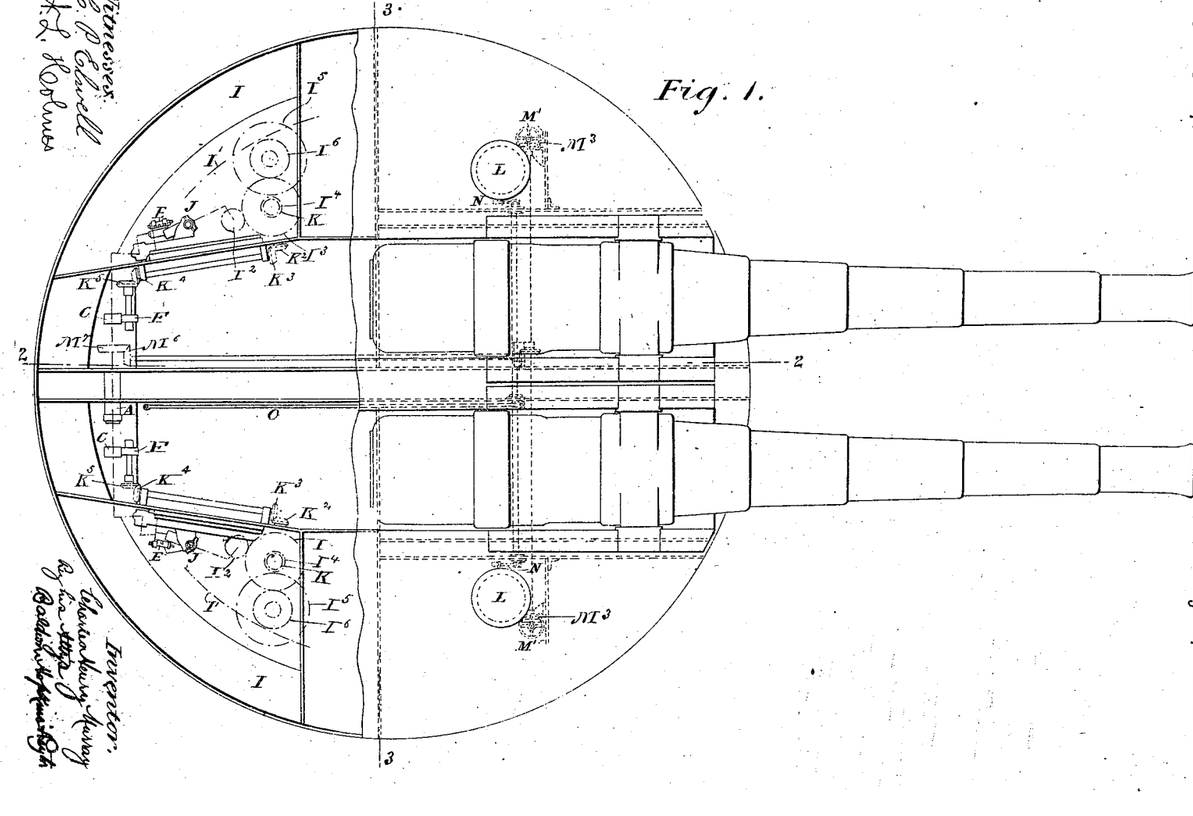
Figure 1 of the drawings hereunto annexed is a plan view, partly in section, of a revolving turret with two guns mounted upon it, some parts fully represented in other figures being omitted, or shown in outline only. Fig.
Figure 1A:
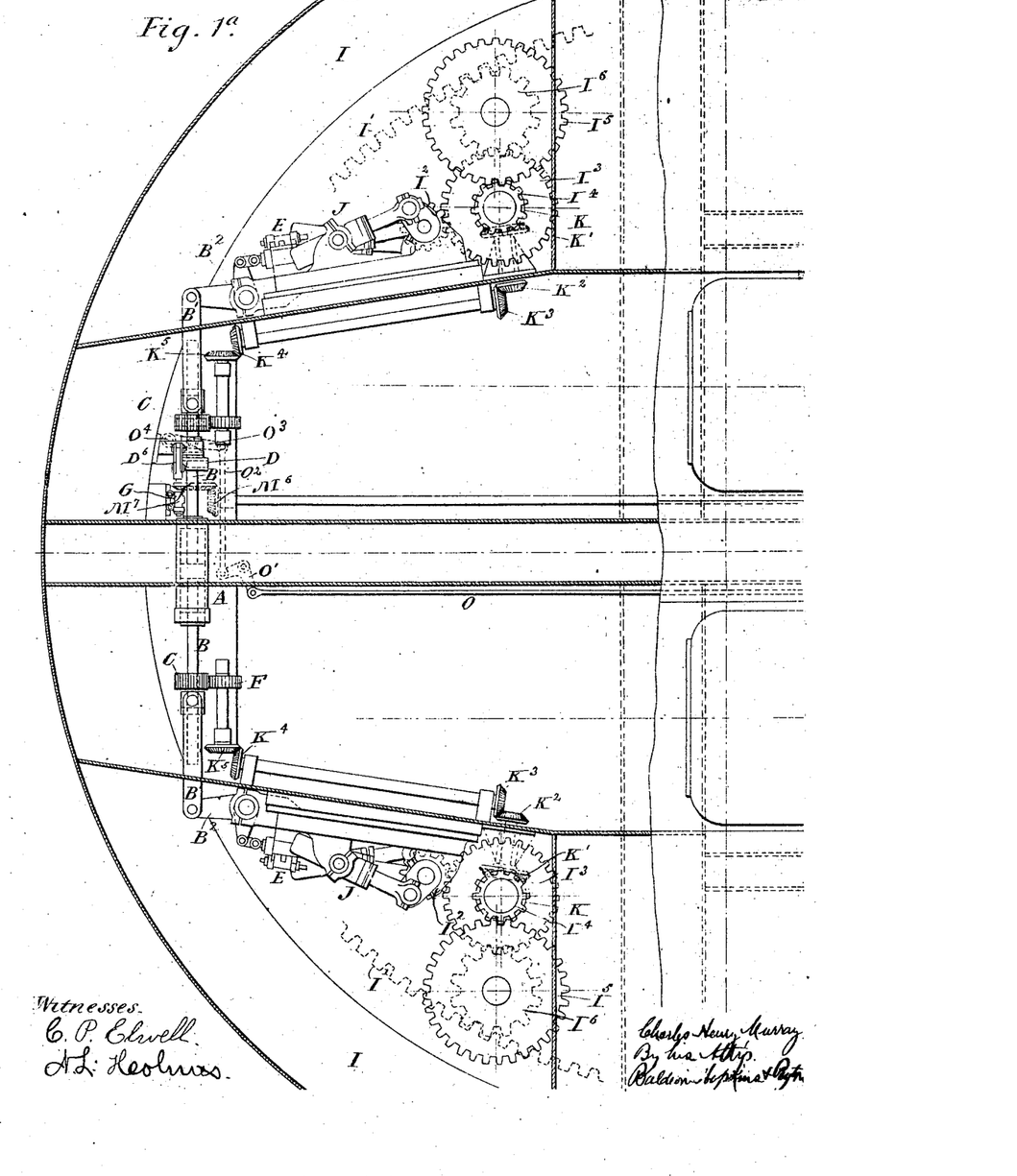
Figure 2:
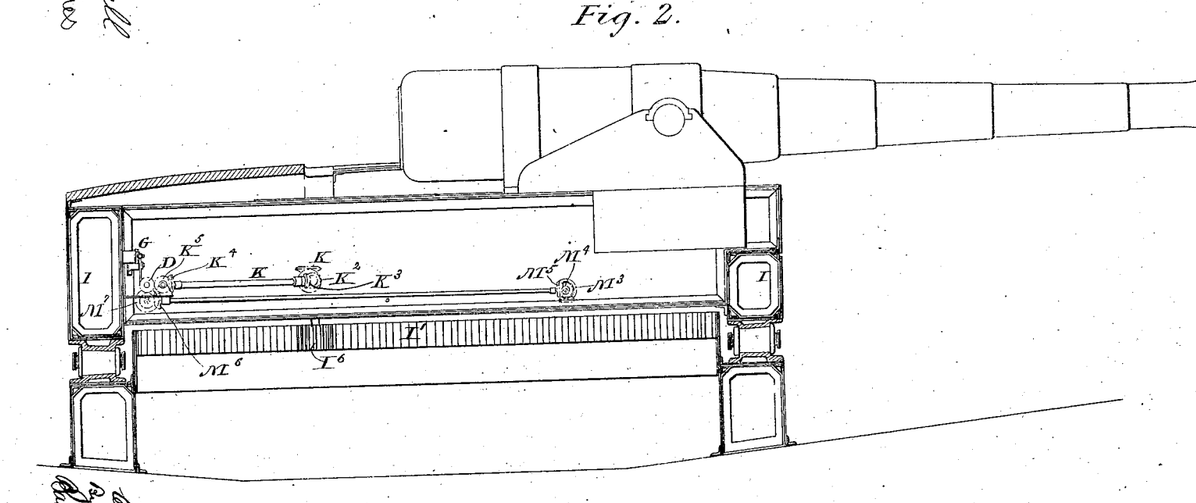
Figure 2A:
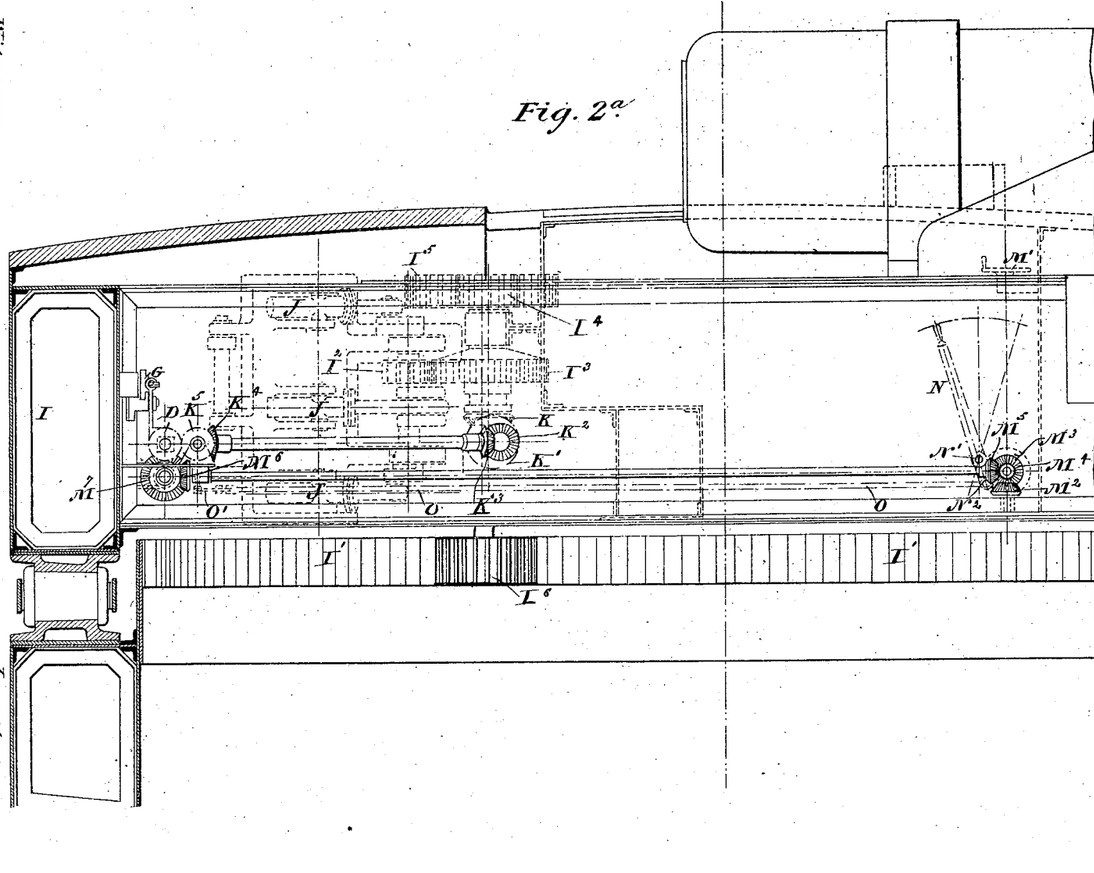
Figure 3:
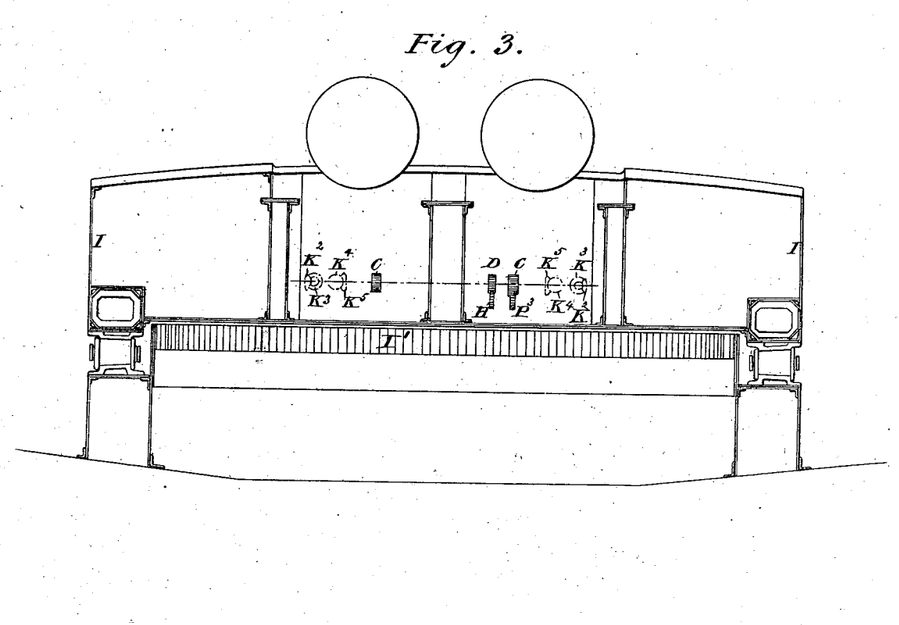
Fig. 3 a vertical section on the line 3 of Fig. 1, some parts fully shown in other figures being omitted or shown in outline only in these two figures.
Figure 3A:
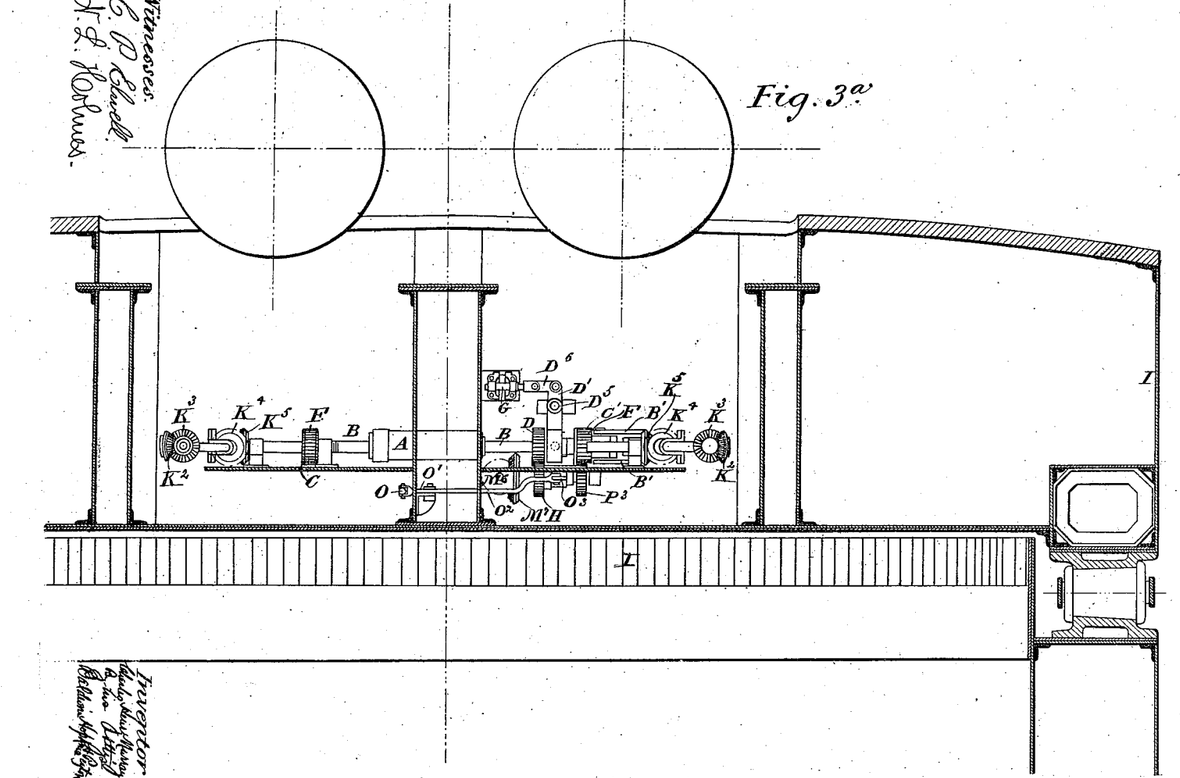
Figures 3B, 3C:
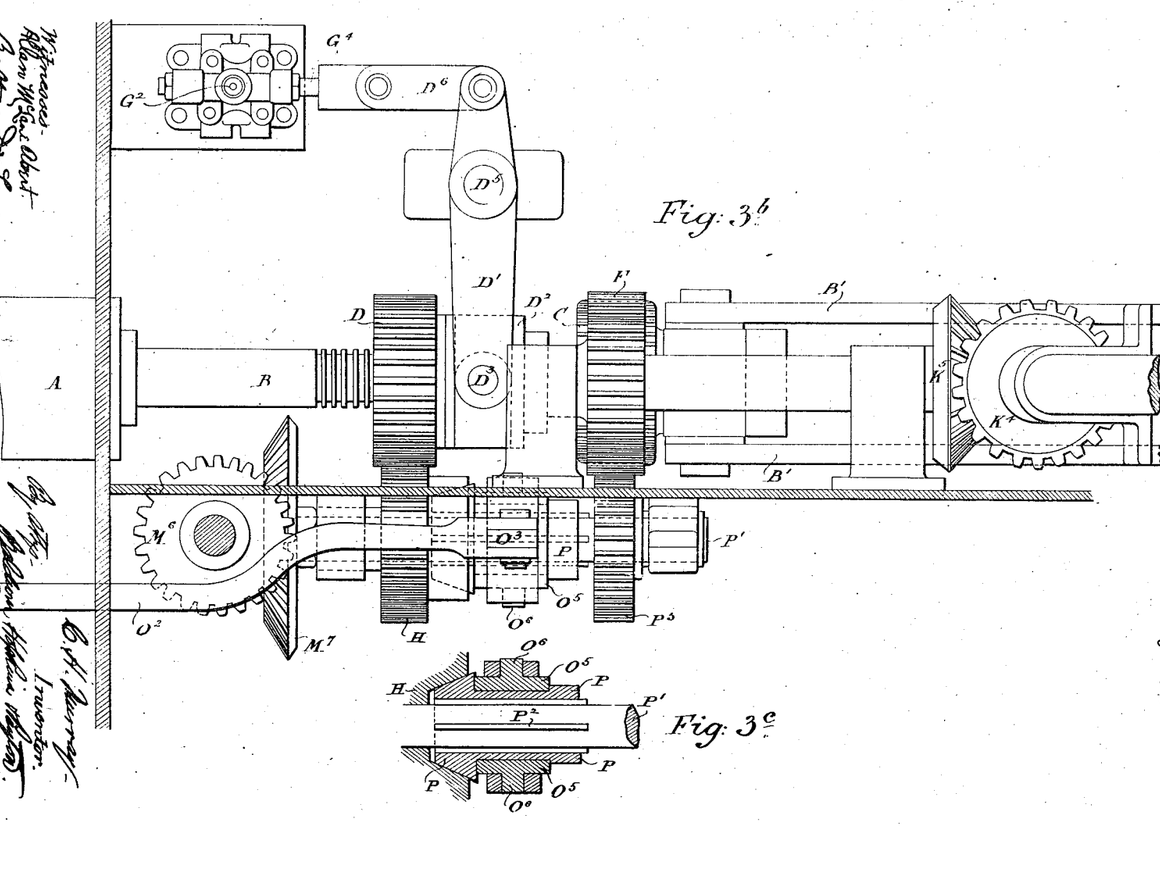

Water under pressure is admitted through the pipe G' to the casing inclosing the valve G, which is an ordinary D slide-valve working to and fro over a fixed valve-face, in which are three ports, the central one, G², an exhaust-port, the two outer ones coupled by pipes G³, one to one end of the cylinder A, the other to the opposite end. The valve can be moved either in one direction or the other along the fixed valve-face from either of the sighting-stations L. In the drawings this is shown to be done as follows: At each sighting-station is a hand-wheel, M', on the axis of which is a bevel-pinion, M², gearing with a bevel-pinion, M³, on the axis of which is a bevel-pinion, M⁴, which gears with a bevel-pinion, M⁵. On the axis of the pinion M⁵ is a bevel-pinion, M⁶, that gears with a bevel-toothed wheel, M⁷, on the axis of the toothed wheel H, gearing into the teeth of the pinion-nut D, carried on the piston-rod B. The nut is embraced by a ring, D², within which it can turn. The ring lies in a groove formed around the nut, so that when the nut is moved endwise the ring is carried along with it. The ring has studs D³ projecting from its two opposite sides. These pass into holes in the two arms of the lower forked end of a lever, D', which turns on a fulcrum at D⁵, and at its upper end is coupled by links D⁶ to the valve-rod G⁴ of the valve G. To enable the auxiliary valve to be kept open without the trouble of continually turning the hand-wheels M', the pinion nut D can be made to turn with the pinion-nut C (as soon as nut D is sufficiently in advance of pinion-nut C) by moving a hand-lever, N. There is a hand-lever N at each sighting-station L. It is fixed on an axis, N', from which a short arm, N², projects downward. This arm is by a rod, O, coupled to one arm of a bell-crank lever, O', the other arm of which is by a rod, O², coupled to the extremity of a lever, O³, which turns on a fulcrum at O⁴. The lever at its central part embraces a ring, O⁵, which lies within a groove formed around a clutch, P, as shown at Fig. 3ᶜ. The ring O⁵ has pins O⁶ projecting from its opposite sides. They enter holes in the lever O³, so that when the lever is rocked it carries the ring O⁵ and clutch P along with it. The clutch P is coned at one end, and when shifted endwise can be made to engage with a corresponding conical recess in the side of the wheel H. The clutch P can be shifted endwise along a shaft, P′, but has to revolve with it by feathers P², projecting from the shaft entering grooves in its boss. The shaft P′ has upon it at one end a toothed wheel, P³, which gears with the teeth of the pinion-nut C. The opposite end of the shaft P′ passes loosely into the hollow axis of the wheels H and M′. In this way when the toothed wheel H is by the clutch P locked to the wheel P³, so that it has to revolve with it, the pinion-nut D must revolve with the pinion-nut C whenever this pinion is revolved.

The action is therefore as follows: By turning the hand-wheel at the sighting-station the pinion D is turned and its nut runs along the screwed piston-rod and by the lever D′ opens the auxiliary valve G. This valve admits water to the starting and reversing cylinder, which thus makes a portion of a stroke and opens the starting and reversing valves of the engines. As soon as the engines run they work the trains of gear K K, which revolve the pinion-nuts C C. These run along the screwed piston-rods and act upon the starting and reversing valves E, bringing them to the stop position again. Thus to keep the engines running it is necessary to continually turn the hand-wheels M′ at the sighting-station, but, if required, when the desired speed of engines is attained, the clamp-gear can be thrown in so that one pinion-nut turns the other, as above explained.

Having now particularly described and ascertained the nature of my said invention and in what manner the same is to be performed, I declare that what I claim is—

1. The combination, consisting of a turret or gun-platform, a hydraulic engine geared therewith, the starting-valve of the said engine, a hydraulic cylinder, piston, and rod coupled with the starting-valve, the controlling-valve of this hydraulic cylinder, the nut on the piston-rod and coupled with the controlling-valve, which nut can be turned by hand-gear, and the other nut on the rod coupled with the starting-valve of the engine and also geared with the engine, the whole combined and operating substantially as described.

2. The combination, consisting of a turret or gun-platform, a hydraulic engine geared therewith, the starting-valve of the said engine, a hydraulic cylinder, piston, and rod coupled with the starting-valve, the controlling-valve of this hydraulic cylinder, the nut on the piston-rod and coupled with the controlling-valve, the hand-gear for turning this nut from a distance, the other nut on the rod coupled with the starting-valve of the engine and also geared with the engine, and the clutch and its gear for locking the nuts together, the whole combined and operating substantially as described.

C. H. MURRAY.

Witnesses:
T. PURVIS,
WM. JOHN GREY,
*Notary Public.*